(12) United States Patent
Hyun et al.

(10) Patent No.: US 10,449,024 B2
(45) Date of Patent: Oct. 22, 2019

(54) APPARATUS GENERATING SPINAL CORD CONTUSIVE MODEL OF ANIMALS AND GENERATION METHOD

(71) Applicant: DANKOOK UNIVERSITY CHEONAN CAMPUS INDUSTRY ACADEMIC COOPERATION FOUNDATION, Chungcheongnam-so (KR)

(72) Inventors: Jung Keun Hyun, Seoul (KR); Ilyong Park, Chungcheongnam-do (KR); Min Soo Kim, Chungcheongnam-do (KR); Hyeongbeom Kim, Chungcheongnam-do (KR); Kyeong Wook Yoon, Chungcheongnam-do (KR)

(73) Assignee: DANKOOK UNIVERSITY CHEONAN CAMPUS INDUSTRY ACADEMIC COOPERATION FOUNDATION, Chungcheongnam-do (KR)

( * ) Notice: Subject to any disclaimer, the term of this patent is extended or adjusted under 35 U.S.C. 154(b) by 99 days.

(21) Appl. No.: 15/712,523

(22) Filed: Sep. 22, 2017

(65) Prior Publication Data
US 2018/0085209 A1   Mar. 29, 2018

(30) Foreign Application Priority Data

Sep. 23, 2016  (KR) .................. 10-2016-0121954
Sep. 23, 2016  (KR) .................. 10-2016-0121955

(51) Int. Cl.
*A61D 1/00*    (2006.01)
*A61D 3/00*    (2006.01)

(52) U.S. Cl.
CPC .................. *A61D 1/00* (2013.01); *A61D 3/00* (2013.01); *A01K 2267/03* (2013.01)

(58) Field of Classification Search
CPC ......... A61D 1/00; A61D 3/00; A01K 2267/03
USPC ...................................................... 73/12.01
See application file for complete search history.

(56) References Cited

U.S. PATENT DOCUMENTS

| | | | | |
|---|---|---|---|---|
| 6,389,876 B1* | 5/2002 | Tanimura | .................. | G01N 3/06 73/12.01 |
| 2005/0051179 A1* | 3/2005 | Foong | ................ | A61K 49/0008 128/897 |
| 2010/0307258 A1* | 12/2010 | Brandestini | ............ | G01N 3/307 73/803 |

* cited by examiner

*Primary Examiner* — Max H Noori (57) ABSTRACT

The present disclosure provides an apparatus generating spinal cord contusive model of animals, including an external fixation member fixed outside a body of an experiment animal, an impactor configured to impart a spinal cord of the experiment animal, and an impactor guide member fixed to the external fixation member to guide a fall of the impactor, wherein the impactor is provided with an acceleration sensor.

14 Claims, 4 Drawing Sheets

APPARATUS GENERATING SPINAL CORD CONTUSIVE MODEL OF ANIMALS AND GENERATION METHOD

CROSS-REFERENCE TO RELATED APPLICATION

This application claims priority of Korean Patent Application No. 10-2016-0121954, filed on Sep. 23, 2016 and priority of Korean Patent Application No. 10-2016-0121955, filed on Sep. 23, 2016, in the KIPO (Korean Intellectual Property Office), the disclosure of which is incorporated herein entirely by reference.

BACKGROUND OF THE INVENTION

Field of the Invention

The present disclosure relates to an apparatus for the generation of an animal spinal cord injury model, and more particularly, to an apparatus and method that inflicts spinal cord injury (hereinafter shortened as 'SCI') by dropping an impactor in free fall to impact the spinal cord.

Description of the Related Art

Spinal cord injury is caused by trauma such as car, sporting and industrial accidents and non-trauma such as infection, loss of blood supply, tumor and spinal distortion, and common causes are trauma. The symptoms of spinal cord injury include impairment of motor and sensory function. Spinal cord injury often happens in young people because most of spinal cord injuries result from accidents, and neurological recovery in spinal cord injury is not easy compared to peripheral nerve injury, resulting in many types of impairments, so spinal cord injury is catastrophic, affecting loss of economy, emotion and time of the patient and family.

From this perspective, development of treatment methods of spinal cord injury using animals is an essential process for clinical trials, and currently, many types of spinal cord injury models are used in animal testing. After all, spinal cord injury models are an essential process to find the causes of spinal cord injury in humans and develop systematic treatment methods.

Existing spinal cord injury models using animals may be largely classified into two based on the method of injury. One is a transection model of which the spinal cord is transected in part or in whole, and the other is a contusion model of which the spinal cord is damaged by impact of a weight with a defined mass dropped from a preset height. The contusion model is the most commonly occurring injury mechanism in human clinical trials, and is mainly used for study of spinal cord injury mechanisms or assessment of early phases of injury.

Spinal cord injury models may be classified into incomplete spinal cord injury and complete spinal cord injury based on the injury severity. The most common type of spinal cord injury occurring in clinical trials is closed partial contusion injury caused by vertebral burst fracture and spinal disc herniation due to injury, and complete spinal cord injury caused by a transection in the spinal cord is less common. Accordingly, many spinal cord injury experiments use partial contusion injury models, but disadvantages of these injury models are that it is not easy to clearly identify a desired treatment effect due to non-uniform damage severity and relatively high levels of intrinsic recovery ability of the spinal cord, and it is difficult to clearly distinguish regeneration of the damaged axons and nerves from collateral sprouting in the surviving nervous tissue after damage. For a solution to these disadvantages, complete spinal cord injury models may be used.

Figure 1:
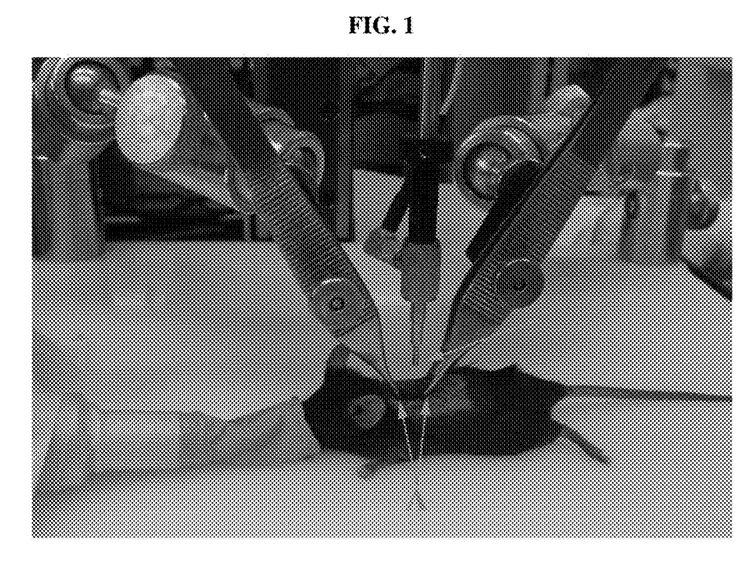
FIGS. 1 and 2 show an animal spinal cord injury model apparatus according to the related art.

Conventionally, permanent loss of tissue related to nerve function or nerve regeneration of the spinal cord may occur due to SCI, and in studies of the development of treatments for SCI, investigators have primarily used rodents such as mice or rats in animal testing as shown in FIG. 1.

However, modeling of animals having more similar spinal cords to humans than rodents was needed, and in 2013, Lee, Kwon et al., University of British Columbia in Canada, developed a model of SCI using female Yucatan miniature pig of about 20-25 kg and a spinal cord injuring device (SC impactor) devised by them. The spinal cord injuring apparatus used is as shown in FIG. 2.

Figure 2:
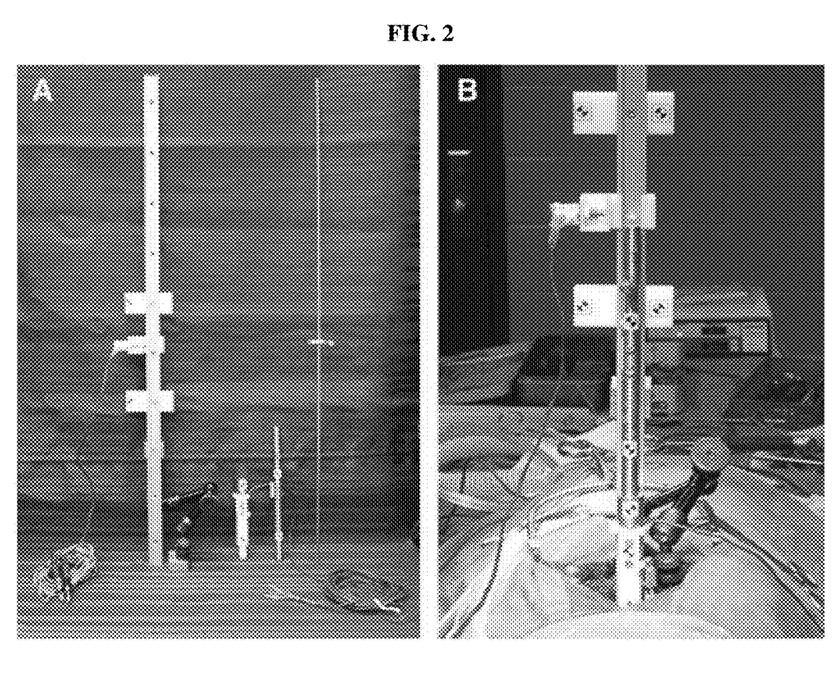

The original source of the photographic images of FIGS. 1 and 2 is on http://www.bio-protocol.org/e886 and Lee et al., Journal of Neurotrauma 30:142-159, Feb. 1, 2013.

The apparatus is largely divided into two: a guide member indicated by number 1, and an impactor indicated by number 2 in the left picture of FIG. 2. The guide member is a tool that plays a role in guide the impactor to accurately fall onto the porcine spinal cord, and a solenoid mounted on the guide member rail is the trigger of free fall. Quadrant (marker) attached to the rail is attached to the impactor as well, and they are tracked using a high-speed video camera system and used to calculate the velocity and displacement. The guide member is fixed at the back and abdomen of the animal with pedicle screws. The impactor includes a tip that touches the quadrant (marker) and the spinal cord, and a load cell sensor connected to the tip. Particularly, the high-speed camera is a high-priced device that is an economical burden factor to the system architecture, and the time resolution of physical quantity measurements resulting from impact is limited by low frame rates set at the commonly used image resolution. For example, in the case of Phantom Miro M320S, the device ranges in price from USD 45,000 to 60,000 depending on the elements, and has a maximum frame rate of 3,280 FPS at 1280×720 resolution.

The procedure for SCI experiment using the device is summarized in brief as below. First, after a high speed camera is installed, a guide member is fixed to an anesthetized animal using pedicle screws, and then, an impactor is mounted on a rail of the guide member deployed vertically, and the impactor is moved to a solenoid fixed at a defined height and gets ready to fall. After the condition of the anesthetized animal (the condition of bones, muscles, and tissues) is identified, a trigger signal is given to the solenoid to cause the impactor to drop in free fall to impact the spinal cord, resulting in acute traumatic spinal cord injury. In some cases, to give additional damage to the target spinal cord, the pressure is applied continuously to the spinal cord with the impactor still held for a defined period of time (about 5 minutes) immediately after the fall. The physical quantities related to the impact that can be obtained using the experiment apparatus are peak force, impact velocity, maximum dural displacement, and peak pressure. The peak force is measured using the load cell sensor attached to the impactor, and the impact velocity and the maximum dural displacement are measured by tracking the markers attached to the aforementioned devices using a high-speed video camera system. The peak pressure is measured using the peak force and the area of the cross section of the tip. In this instance, the peak force having dynamic properties does not stay static and sharply changes at impact, and as load cell output signals are limited in bandwidth through a low pass filter for removing noise, there is a likelihood that errors in peak force measurement may occur.

The problems of the conventional impactor system for inflicting SCI on large animals are summarized as below:

1. To implement the apparatus, there are disadvantages; a high-priced high speed video camera is indispensably needed, and complex algorithm software for video system that tracks the motion of the impactor is necessary.

2. Despite using the high-priced video system, errors may occur in physical quantity measurement, such as the impact velocity and the maximum spinal cord indentation depth, rapidly changing due to the high speed camera having a relatively low frame rate.

3. Peak force having dynamic properties does not stay static and sharply changes at impact, and as load cell output signals are limited in bandwidth through a low pass filter for removing noise, there is a likelihood that errors in peak force measurement may occur.

4. Peak force is an instantaneous force applied to the spinal cord, and is unsuitable to typically represent a force applied by an impact for a defined amount of time even though it is a short time.

5. The video system described previously may have varying measured values of the impact velocity and the maximum spinal cord indentation depth depending on the installation location and orientation of the camera, requiring a defined distance from the impactor device and accurate placement.

6. A fixation technique using pedicle screws is an invasive method that may inflict a nerve injury or vascular injury on a fixed site.

Meanwhile, the most important requirement as an experiment model of spinal cord injury is a standardized damage method, and a difference in the degree of recovery between subjects damaged by the same method that is not great and so uniform that a treatment effect between a control group and an experiment group can be clearly distinguished.

SUMMARY OF THE INVENTION

The present disclosure is directed to providing an apparatus generating spinal cord contusive model of animals and method that provides an approach to control an impact for inducing SCI using multiple sensors including an acceleration sensor, a load cell sensor, an LED and a photo sensor and measure the impact physical quantity, that provides means to measure parameters related to SC impact and a sensor graph quickly and accurately based on the multiple sensors and measure an accurate impact velocity by reflecting a change in acceleration caused by friction using the acceleration sensor, and that excludes the influence of respiration or tiny movements of an experiment animal on the motion of an impactor.

The present disclosure provides apparatus generating spinal cord contusive model of animals, including an external fixation member fixed outside a body of an experiment animal, an impactor configured to impart a spinal cord of the experiment animal, and an impactor guide member fixed to the external fixation member to guide a fall of the impactor, wherein the impactor is provided with an acceleration sensor.

Preferably, a protrusion protruding on the bottom of the impactor is provided to directly impart the spinal cord, and an LED is provided on top of the impactor. To reduce the influence from an external light source such as natural light or indoor lighting, the LED may use an infrared LED and its output light may be AC modulated and driven.

A photo sensor is provided at a defined location of a lower part of the impactor guide member to detect a signal from the LED. To reduce the influence of an ambient external light source, an optical band pass filter that only transmits a wavelength component of an infrared LED may be attached to a front surface of the photo sensor.

Preferably, a protrusion protruding on the bottom of the impactor is provided to directly impart the spinal cord, and an infrared LED is provided on top of the impactor.

A photo detector is provided at a defined location of a lower part of the impactor guide member to detect a signal from the infrared LED.

A 3-axis translator is placed between the impactor guide member and the external fixation member to drop the impactor at an exact location.

A rail is placed in a vertical direction on a front surface of the impactor guide member to guide a vertical fall of the impactor.

A solenoid device is placed on a side of the impactor to initiate a free fall of the impactor in response to a trigger signal being received.

The weight of the impactor may be 10-100 g.

The drop height of the impactor may be 10 to 50 cm.

A load cell sensor may be further provided within the impactor.

The external fixation member includes a vertical support fixed at a defined location outside the body, a horizontal support fixed to the vertical support, and a connecting member connecting the horizontal support to the vertical support in the vertical and horizontal directions and rotatably.

Furthermore, the present disclosure provides an animal spinal cord injury model generation method using an impactor configured to impart a spinal cord of an experiment animal and an impactor guide member configured to guide a fall of the impactor, wherein the impactor is provided with an acceleration sensor to calculate acceleration of the impactor, the method including a first step of calculating velocity at moment of impact by integrating acceleration from the time of free-fall of the impactor to the moment of impact, a second step of calculating an impulse using multiplication of a mass of the impactor and a velocity change during a period of impact of the spinal cord, and a third step of calculating an impulsive force using the impulse calculated at the second step and the period of impact of the spinal cord.

The time reaching a point in time in which a distance between an LED and a photo sensor is minimum may be selected as the final time, wherein the LED is mounted on the impactor and the photo sensor is mounted on the impactor guide member.

The spacing distance between the LED and the photo sensor is measured using the LED and the photo sensor, and after each of the distance at the impact time and the distance at the final time is measured, a maximum indentation depth may be calculated using a difference between.

Preferably, a trigger signal initiating the free-fall of the impactor is generated at the end of exhalation or inhalation by detecting respiratory motion of the experiment animal.

The present disclosure relates to an apparatus and method that controls an impact for inducing SCI and measures the impact physical quantity using multiple sensors including an acceleration sensor, a load cell sensor, an LED and a photo sensor in low price without a high-priced video system equipped with a high speed camera and a complex pattern recognition algorithm. Parameters related to SC impact and a sensor graph can be measured quickly and accurately based on the multiple sensors, and an accurate impact velocity can be measured by reflecting a change in acceleration caused by friction using the acceleration sensor. The displacement of an impacted object such as the maximum spinal cord indentation depth can be measured using the LED and the photo sensor. Furthermore, because a guide member is fixed outside the body, dissimilar to a fixation method in the body, the influence of respiration or tiny movements of a pig on the motion of an impactor is excluded, and because pedicle screws for fixation in the body are not used, damage in nerves or blood vessels of a fixed site can be prevented, and fine adjustment of the guide member for an accurate location of fall and a direction of vertical fall is enabled through a 3-axis motion adjuster.

BRIEF DESCRIPTION OF THE DRAWINGS

The above and other features and advantages will become more apparent to those of ordinary skill in the art by describing in detail exemplary embodiments with reference to the attached drawings, in which.

In the following description, the same or similar elements are labeled with the same or similar reference numbers.

DETAILED DESCRIPTION

The present invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "includes", "comprises" and/or "comprising," when used in this specification, specify the presence of stated features, integers, steps, operations, elements, and/or components, but do not preclude the presence or addition of one or more other features, integers, steps, operations, elements, components, and/or groups thereof. In addition, a term such as a "unit", a "module", a "block" or like, when used in the specification, represents a unit that processes at least one function or operation, and the unit or the like may be implemented by hardware or software or a combination of hardware and software.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Preferred embodiments will now be described more fully hereinafter with reference to the accompanying drawings. However, they may be embodied in different forms and should not be construed as limited to the embodiments set forth herein. Rather, these embodiments are provided so that this disclosure will be thorough and complete, and will fully convey the scope of the disclosure to those skilled in the art.

Figure 3:
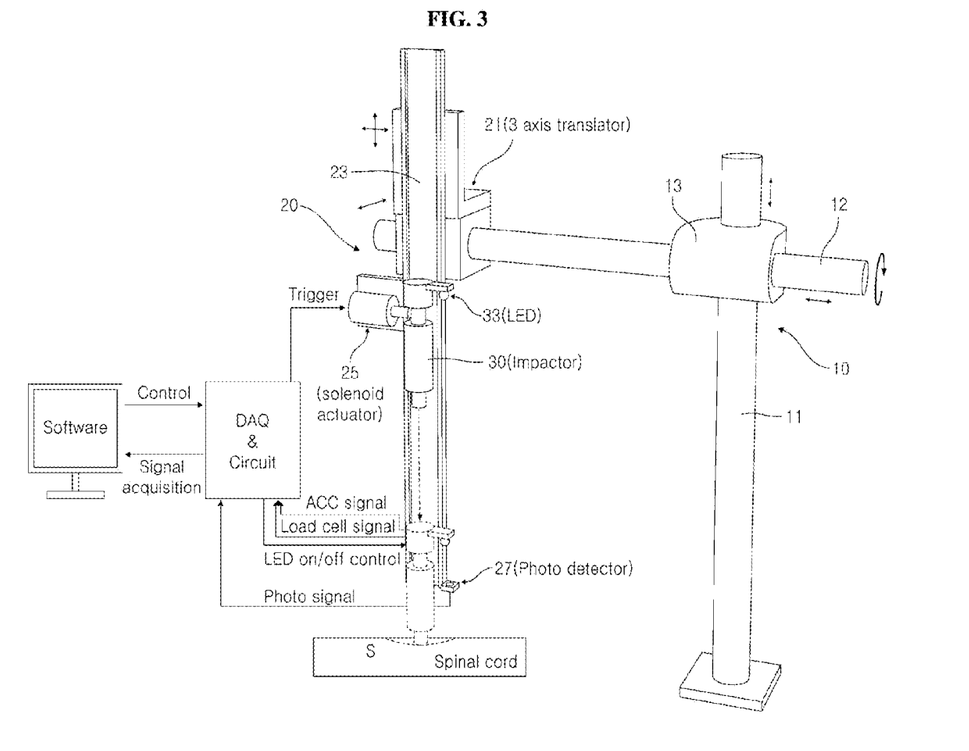
FIG. 3 shows an apparatus generating spinal cord contusive model of animals according to the present disclosure.

An apparatus generating spinal cord contusive model of animals proposed by the present disclosure to induce SCI is as shown in FIG. 3.

The apparatus generating spinal cord contusive model of animals according to the present disclosure includes an external fixation member 10 fixed outside the body, and an impactor guide member 20 fixed to the external fixation member 10 to guide a fall of an impactor.

The conventional fixation method involves fixation in the body with pedicle screws, but the present disclosure performs fixation using the external fixation member, to be detailed, including a vertical support 11 fixed at a specific location outside the body, a horizontal support 12 fixed to the vertical support, and a connecting member 13 connecting the horizontal support to the vertical support in the vertical and horizontal directions and rotatably. The connecting member is characterized by enabling 3-axis fine motion control, and for 3-axis fine control means, various techniques such as ball screws or screw coupling may be applied, and this principle is commonly used in the technical field and its detailed description of technique is omitted herein.

The impactor guide member 20 includes a 3-axis translator 21, a drop guide member 23, a solenoid actuator 25, and a photo detector (photo sensor) 27.

Furthermore, the horizontal support 12 is connected to the 3-axis translator 21 to drop the impactor at an exact location. Furthermore, the drop guide member 23 is placed in the vertical direction on the front surface of the 3-axis translator. The drop guide member 23 can make relative movements (upward and downward, leftward and rightward, and rotational movements) to the horizontal member 12 by the 3-axis translator.

Furthermore, a rail is provided on the front surface of the drop guide member 23 to guide the free-fall of the impactor 30. A protrusion protruding on the bottom of the impactor is provided to directly strike the spinal cord S, and an LED 33 is provided on top of the impactor. The LED may be an infrared LED or another light source. Furthermore, the solenoid actuator 25 is placed on the side of the impactor 30 to hold the impactor using magnetism. The solenoid actuator 25 plays a role in initiating the free-fall of the impactor when a control unit receives a trigger signal.

The photo sensor 27 is provided at a defined location of the lower part of the drop guide member 23 to detect the LED 33 signal, and through this, the photo sensor detects the position of the impactor because the LED is fixed integrally on top of the impactor.

To detect the displacement of the falling impactor, the present disclosure does not use a high-speed video camera and a high-priced video system, and uses the LED and the photo sensor that detects it. The impactor is made of a different material (metal such as steel, stainless and aluminum) from existing impactors, and has the load cell sensor and the acceleration sensor embedded therein and the LED attached to the top.

The features of the operation mechanism of the apparatus generating spinal cord contusive model of animals using the foregoing configuration are as follows.

1. The multiple sensors including the acceleration sensor, the load cell sensor and the photo sensor are provided in the impactor to calculate the impact physical quantity for inducing SCI. The impact physical quantity may include an impact velocity, a maximum spinal cord indentation depth, and an average force (impulsive force) applied until a maximum depth is reached, and the impact physical quantities may be measured quickly and accurately using the improved resolving power (a faster sampling rate, a few tens of kHz to a few hundreds of kHz). That is, the impact physical quantity parameters may be derived in real time based on data measured by 3 sensors (multi-sensor), and it is possible to immediately determine whether the impactor made a normal motion or an abnormal impact occurred through aspects of a graph displayed on the GUI screen.

2. Furthermore, because the guide member is fixed outside the body, it is possible to exclude the influence of respiration or tiny movements of the pig on the free-fall motion of the impactor at the rail in the same way as the conventional fixation method in the body, and because pedicle screws for fixation in the body are not used, there is no risk of nerve injury or vascular injury of a fixed site.

3. Fine control of the guide member for an accurate location of fall and a direction of vertical fall is enabled through the 3-axis motion adjuster. That is, by detecting the pig's respiratory motion, an impactor drop trigger signal may be generated at the end of exhalation or inhalation.

4. In a real experiment environment, there are many factors slowing down the impactor such as friction of the rail and the spine or blood near SC, and a real impact velocity may be measured by reflecting a real reduction in acceleration of the impactor using the acceleration sensor embedded in the impactor.

Among the impact physical quantities, the impact velocity at impact may be calculated by integrating the acceleration as below. The velocity at impact v1 may be calculated by integrating the acceleration measured by the acceleration sensor over a time interval from the time at the moment at which a free fall begins, i.e., the time t1 of fall beginning, to the time at the impact moment, i.e., the impact time t2.

$$v_I = \int_{t_1}^{t_2} a\, dt$$

$v_I$: Impact velocity
$t_1$: Time of free-fall beginning
$t_2$: Time when tip touched SC
$a$: Acceleration of impactor The velocity at impact v1 is also referred to as impact velocity.

Figure 4:
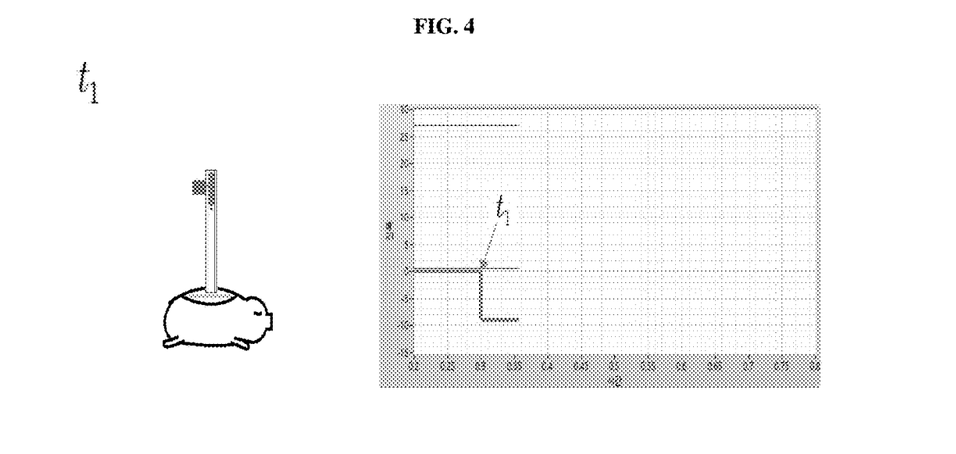
FIGS. 4 and 5 each show predicted diagrams for 3 sensor conversion signals at the time t1 of fall beginning and the impact time t2 (green: a distance signal between an impactor tip and SC converted through a photo sensor, red: a force signal converted through a load cell sensor, blue: an acceleration signal of an impactor converted through an acceleration sensor).
Figure 5:
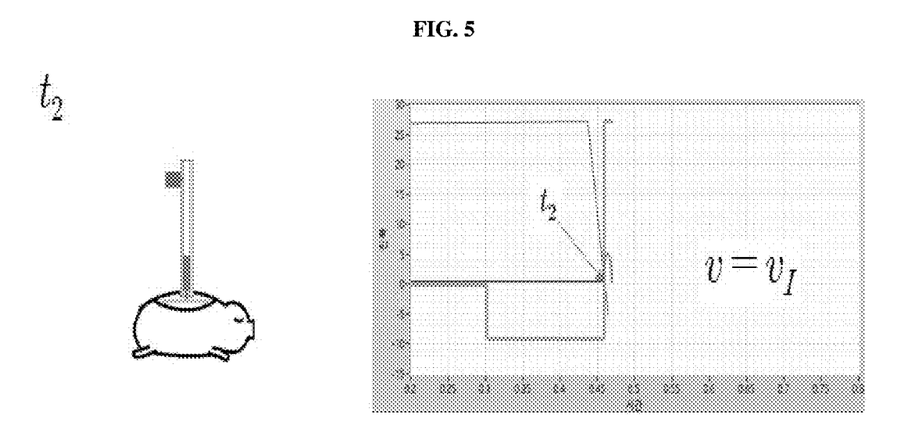

Furthermore, FIGS. 4 and 5 each show predictive signals for 3 sensor signals (green: a distance between the tip and SC converted through the photo sensor, red: a force signal converted through the load cell sensor, blue: an acceleration signal of the impactor converted through the acceleration sensor) at the time t1 of fall beginning and the impact time t2.

As shown in FIG. 4, when the impactor begins to drop in free fall at the time t1 of fall beginning in response to a trigger signal, the acceleration sensor begins to display acceleration, and a point in time in which the velocity changes from the normal condition of the acceleration sensor is automatically or manually selected as the time t1 of fall beginning. In FIG. 5, the impact time t2 corresponds to a point in time in which a signal from the load cell sensor connected to the impactor tip begins to rise when the tip touches SC, and is selected automatically by a program or is selected manually. The automatic selection of t1 and t2 may be performed by various algorithms such as thresholding detection of the absolute value or variable value of each sensor signal.

An impulse that the impactor transmits to SC may be calculated by the following equation. In the following equation, m is the mass of the impactor.

$$I = F_a \Delta t = m \Delta v$$

$F_a$: Impulsive force
m: mass
$\Delta t = t_3 - t_2$
$\Delta v = v_s - v_f$
$V_s = v_I$
$v_f = 0$
$\therefore \Delta v = v_I$ The impulsive force Fa is referred to as an average force applied to SC for a defined period of impact, and may be obtained by modifying the equation for impulse I. The impulse may be expressed as multiplication of the impulsive force and the time during which the impulsive force acts, and equals a change in momentum. When the impact velocity, the impact time t2 that is a point in time in which impact begins, and the velocity at a certain point of the impact are known, an average force that the impactor acts (applies) on SC may be calculated as in the equation. When a point in time in which the impactor presses SC to the maximum depth is set as the final time t3, at that time the impactor is instantaneously stopped by SC (the velocity of the impactor is 0).

Figure 6:
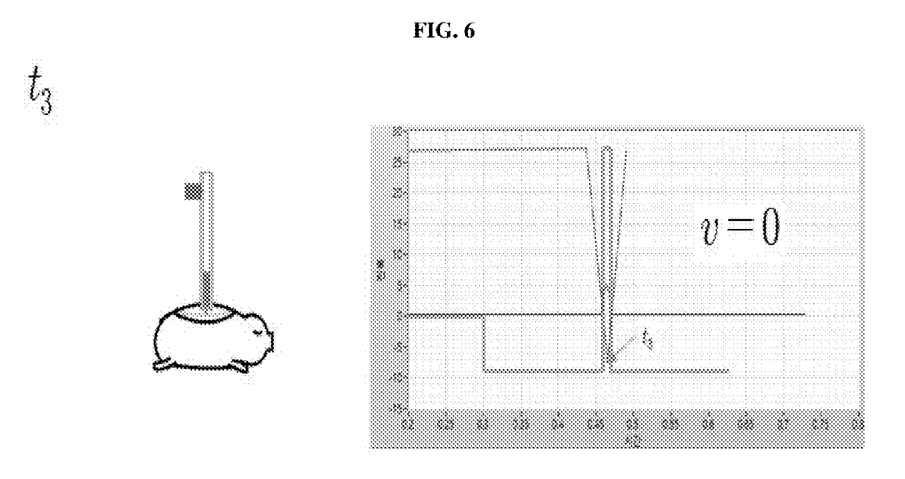
FIG. 6 is a graph showing the measurement of the final time t3 using a distance signal between an impactor tip and SC through a photo sensor.

To measure the final time t3, it is the LED and the photo detector that are mounted on the impactor. As shown in FIG. 6, measuring using the acceleration sensor is theoretically possible, but because an acceleration change at a real impact is a large value beyond the maximum response speed of the acceleration sensor, it is difficult to find an exact point in time, and thus, the time reaching a point in time in which the distance between the LED mounted on the impactor and the photo sensor mounted at the rail tip is minimum is selected as the final time t3 automatically or manually using the photo sensor having a fast response speed. Based on this, Δt (t3−t2) in the equation may be measured, and through this, the impulsive force, or an average force applied until the point in time in which the impactor presses SC to the maximum depth may be calculated.

Through the apparatus, the maximum SC indentation depth D resulting from the impact can be calculated. First, a theoretical calculation method using an equation is as below.

$$D = v_I \Delta t + \frac{1}{2} a_d (\Delta t)^2$$

$$a_d = \frac{\Delta v_d}{\Delta t} \quad \Delta v_d = 0 - v_I \quad a_d = -\frac{v_I}{\Delta t}$$

-continued $$\therefore D = \frac{v_l \Delta t}{2}$$

That is, assume that the acceleration of the impactor is uniform and the velocity changes linearly over a time interval from the impact time t2 to the final time t3, the maximum indentation depth may be only calculated by equations for the impact velocity and Δt. Here, Δt is the time (t3–t2) from the impact to the final time at which the velocity of the impactor instantaneously becomes 0, and the velocity v and the acceleration a with the subscript d denote velocity and acceleration over the time interval Δt.

However, when an impact is really applied to a certain object, the impulsive force does not linearly change and is non-linear, and thus, an error may occur between a real maximum indentation depth and a value obtained by a theoretical equation. Accordingly, in addition to theoretically calculating the maximum indentation depth, the apparatus uses a method that measures the distance between the LED and the photo sensor (photo detector) at t2 and t3 respectively, and calculates the maximum indentation depth D using a difference between.

$$D = D_{t2} - D_{t3}$$

The distance between the LED and the photo sensor may be obtained by converting the measured photo sensor output voltage value to a distance value using a look-up table or an approximation model for distance-sensor output voltage constructed beforehand through a calibration process. Furthermore, the distance between the impactor tip and SC equals a result of subtracting the distance between the LED and the photo sensor when the impactor tip touches SC from the distance between the LED and the photo sensor.

Figure 7:
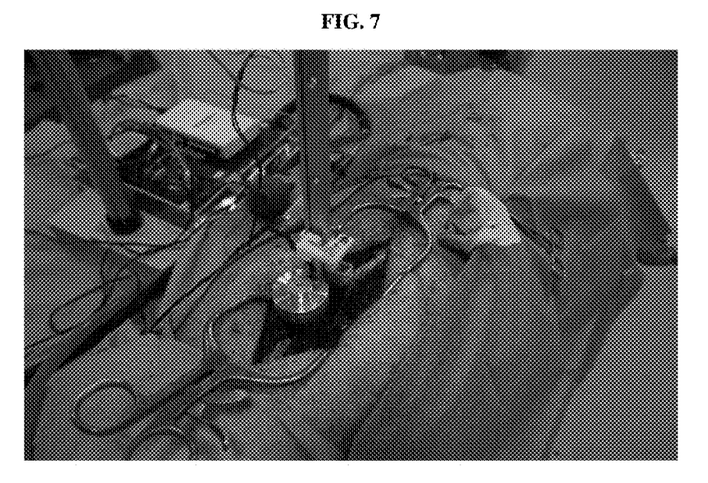
FIG. 7 is a photographic image showing an experiment in a pig using the present disclosure.
Figure 8:
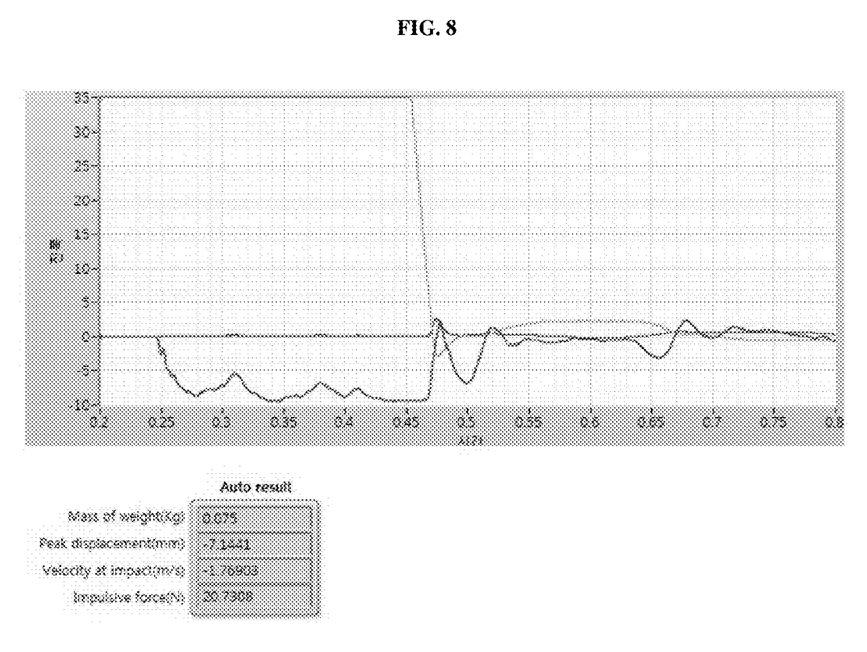
FIG. 8 is a graph showing the results.

FIG. 7 is a photographic image showing a real in-vivo experiment in a pig, and FIG. 8 is a graph showing the results. The experiment was carried out under the condition of height 20 cm and impactor 75 g. The large animal used was Yucantan mini pig (62 kg), and after T9-10 laminectory was performed, thus exposing the spinal cord in the thoracic spine, the impactor was installed at a location at which the impactor would impact the exposed spinal cord. In the graph of FIG. 8, t1, t2 and t3 were measured, and the impactor velocity and the Impulsive force were thereby calculated.

While the present disclosure has been described with reference to the embodiments illustrated in the figures, the embodiments are merely examples, and it will be understood by those skilled in the art that various changes in form and other embodiments equivalent thereto can be performed. Therefore, the technical scope of the disclosure is defined by the technical idea of the appended claims.

The drawings and the forgoing description gave examples of the present invention. The scope of the present invention, however, is by no means limited by these specific examples. Numerous variations, whether explicitly given in the specification or not, such as differences in structure, dimension, and use of material, are possible. The scope of the invention is at least as broad as given by the following claims.

What is claimed is:

1. An apparatus generating spinal cord contusive model of animals comprising:
an external fixation member fixed outside a body of an experiment animal;
an impactor guide member fixed to the external fixation member to enable position change; and
an impactor placed on the impactor guide member, wherein the impactor is allowed to fall to impart a spinal cord of the experiment animal,
wherein a protrusion is provided on bottom of the impactor to directly impart the spinal cord, and an LED is provided on top of the impactor.

2. The apparatus generating spinal cord contusive model of animals of claim 1, wherein a photo sensor is provided at a defined location of a lower part of the impactor guide member to detect a signal from the LED.

3. An apparatus generating spinal cord contusive model of animals comprising:
an external fixation member fixed outside a body of an experiment animal;
an impactor guide member fixed to the external fixation member to enable position change; and
an impactor placed on the impactor guide member, wherein the impactor is allowed to fall to impart a spinal cord of the experiment animal,
wherein a 3-axis translator is placed between the impactor guide member and the external fixation member to drop the impactor at an exact location.

4. An apparatus generating spinal cord contusive model of animals comprising:
an external fixation member fixed outside a body of an experiment animal;
an impactor guide member fixed to the external fixation member to enable position change; and
an impactor placed on the impactor guide member, wherein the impactor is allowed to fall to impart a spinal cord of the experiment animal,
wherein a solenoid device is placed on a side of the impactor to initiate a free fall of the impactor in response to a trigger signal being received.

5. An apparatus generating spinal cord contusive model of animals comprising:
an external fixation member fixed outside a body of an experiment animal;
an impactor guide member fixed to the external fixation member to enable position change; and
an impactor placed on the impactor guide member, wherein the impactor is allowed to fall to impart a spinal cord of the experiment animal,
wherein the external fixation member comprises:
a vertical support fixed at a defined location outside the body of the experiment animal;
a horizontal support fixed to the vertical support; and
a connecting member connecting the horizontal support to the vertical support vertically moveably, horizontally moveably, and rotatably.

6. An apparatus generating spinal cord contusive model of animals comprising:
an external fixation member fixed outside a body of an experiment animal;
an impactor configured to impart a spinal cord of the experiment animal; and
an impactor guide member fixed to the external fixation member to guide a fall of the impactor,
wherein the impactor is provided with an acceleration sensor,
wherein an LED is provided on top of the impactor, and a photo sensor is provided at a defined location of a lower part of the impactor guide member to detect a signal from the LED.

7. An apparatus generating spinal cord contusive model of animals comprising:

an external fixation member fixed outside a body of an experiment animal;
an impactor configured to impart a spinal cord of the experiment animal; and
an impactor guide member fixed to the external fixation member to guide a fall of the impactor,
wherein the impactor is provided with an acceleration sensor,
wherein a 3-axis translator is placed between the impactor guide member and the external fixation member to drop the impactor at an exact location.

8. An apparatus generating spinal cord contusive model of animals comprising:
an external fixation member fixed outside a body of an experiment animal;
an impactor configured to impart a spinal cord of the experiment animal; and
an impactor guide member fixed to the external fixation member to guide a fall of the impactor,
wherein the impactor is provided with an acceleration sensor,
wherein a solenoid device is placed on a side of the impactor to initiate a free fall of the impactor in response to a trigger signal being received.

9. A method generating spinal cord contusive model of animals, using an external fixation member fixed outside a body of an experiment animal, an impactor configured to impart a spinal cord of the experiment animal, and an impactor guide member configured to guide a fall of the impactor, wherein the impactor is provided with multiple sensors to calculate acceleration of the impactor, the method comprising:
a first step of calculating velocity at moment of impact by integrating acceleration from the time of free-fall of the impactor to the moment of impact;
a second step of calculating an impulse using multiplication of a mass of the impactor and a velocity change during a period of impact of the spinal cord; and
a third step of calculating an impulsive force using the impulse calculated at the second step and the period of impact of the spinal cord.

10. The method generating spinal cord contusive model of animals of claim 9, wherein a relation for calculating the impulse at the second step uses the following equation:

$I = F_a \Delta t = m \Delta v$ $F_a$: Impulsive force
m: mass
$\Delta t = t_3 - t_2$ $\Delta v = v_s - v_f$
$V_s = v_I$
$v_f = 0$
$\therefore \Delta v = v_I$ where m: mass of the impactor, t1: time of fall beginning, t2: impact time, t3: final time.

11. The method generating spinal cord contusive model of animals of claim 9, further comprising:
a fourth step of calculating a maximum spinal cord indentation depth resulting from the impact of the impactor using the following equation:

$$D = v_I \Delta t + \frac{1}{2} a_d (\Delta t)^2$$

$$a_d = \frac{\Delta v_d}{\Delta t} \quad \Delta v_d = 0 - v_I \quad a_d = -\frac{v_I}{\Delta t}$$

$$\therefore D = \frac{v_I \Delta t}{2}$$

where D: maximum spinal cord indentation depth.

12. The method generating spinal cord contusive model of animals of claim 10, further comprising:
selecting, as the final time, a point in time in which a distance between an LED and a photo sensor is minimum, wherein the LED is mounted on the impactor and the photo sensor is mounted on the impactor guide member,
wherein the final time is a point in time in which the impactor presses the spinal cord of the experiment animal to a maximum depth.

13. The method generating spinal cord contusive model of animals of claim 12, wherein the distance between the LED and the photo sensor is measured, and
each of the distance at the impact time and the distance at the final time is measured, and a maximum indentation depth is calculated using the following equation:

$$D = D_{t2} - D_{t3}$$

where D: maximum indentation depth.

14. The method generating spinal cord contusive model of animals of claim 9, wherein a trigger signal initiating the free-fall of the impactor is generated at the end of exhalation or inhalation by detecting respiratory motion of the experiment animal.

* * * * *